(12) United States Patent
Arteta et al.

(10) Patent No.: US 11,661,964 B2
(45) Date of Patent: May 30, 2023

(54) FASTENER

(71) Applicant: ILLINOIS TOOL WORKS INC., Glenview, IL (US)

(72) Inventors: Javier Arteta, Les Franqueses (ES); Ivan Cipres, Creglingen (DE); Francisco Cuervas, Les Franqueses (ES); Josep Ventallo Sabater, Les Franqueses (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 342 days.

(21) Appl. No.: 16/841,775

(22) Filed: Apr. 7, 2020

(65) Prior Publication Data

US 2020/0325926 A1 Oct. 15, 2020

(30) Foreign Application Priority Data

Apr. 9, 2019 (EP) .................................. 19382262
Jan. 22, 2020 (EP) .................................. 20382034

(51) Int. Cl.
*F16B 21/08* (2006.01)
*B60R 13/02* (2006.01)

(52) U.S. Cl.
CPC ........ *F16B 21/086* (2013.01); *B60R 13/0206* (2013.01)

(58) Field of Classification Search
CPC ......... Y10T 24/42; F16B 21/086; F16B 21/02
See application file for complete search history.

(56) References Cited

U.S. PATENT DOCUMENTS

| | | | |
|---|---|---|---|
| 3,177,540 A * | 4/1965 | Hall | ...................... F16B 21/086 24/453 |
| 4,668,145 A | 5/1987 | Hirohata | |
| 4,705,442 A * | 11/1987 | Fucci | ...................... F16B 21/08 24/453 |
| 4,743,152 A | 5/1988 | Nakayama | |
| 4,906,152 A | 3/1990 | Kurihara | |
| 5,448,804 A * | 9/1995 | Warren | ................... F16B 5/126 24/297 |
| 5,658,110 A * | 8/1997 | Kraus | ................... F16B 21/086 411/908 |

(Continued)

FOREIGN PATENT DOCUMENTS

| | | |
|---|---|---|
| EP | 1447575 A1 | 8/2004 |
| WO | WO 2010/117322 A1 | 10/2010 |

*Primary Examiner* — Robert Sandy
*Assistant Examiner* — Michael S Lee
(74) *Attorney, Agent, or Firm* — Thompson Hine LLP (57) ABSTRACT

A fastener for coupling a first component to a mounting hole of a second component. The fastener includes a central body portion, a head portion, provided at the proximal end of the central body portion. The fastener has at least two resilient ribs, protruding radially outward from an outer surface of the central body portion. The fastener includes at least a first pair of diametrically opposed recessed surfaces, provided at the proximal end of the central body and extending axially between the head portion and a respective shoulder portion formed by each one of the first pair of recessed surfaces. The at least two resilient ribs extend along the outer surface of the central body portion in a direction along the central axis between the distal end and the proximal end, and axially past the respective shoulder portion.

12 Claims, 9 Drawing Sheets

(56) References Cited

U.S. PATENT DOCUMENTS

| | | |
|---|---|---|
| 2004/0191025 A1 | 9/2004 | Bauer |
| 2012/0131772 A1 | 5/2012 | Hofmann |
| 2018/0010625 A1 | 1/2018 | Goldberg |

* cited by examiner (a)

FASTENER

The present invention relates to a fastener. In particular, but not exclusively, the present invention relates to a fastener for coupling a first component to a mounting hole of a second component. For example, a first and second component of a vehicle wall panel.

INTRODUCTION

Fasteners, such as simple screws, grommets or push clips are commonly used for coupling together two components of a vehicle, for example, a panel or interior trim board is attached to the chassis of a car. Here, the fastener (e.g. a plastic push clip or grommet) is simply pushed through an aperture of the panel and attachingly inserted into a suitable opening of the chassis. A tool (e.g. screw driver) is typically used to fasten the screw or lock the screw grommet into place. Also, a push clip may simply be pushed into a coupling engagement with the opening of the chassis or other component (e.g. the clip may have a resilient locking member that is squeezed through the opening). Typically, when using screw fasteners, e.g. screw grommets, that are rotatingly locked into coupling engagement, a tool is required to rotate the screw fastener into position.

In the manufacture and assembly of vehicles a significant volume of fasteners is usually required for attaching a variety of components (e.g. interior trims, pipes, brackets, airbags, cables etc.) to a structure or other components of the vehicle. As such, it takes a considerable amount of time to place and correctly install each one of the multitude of fasteners used.

An example of such a fastener is disclosed in EP1447575A1. This document describes a screw grommet of plastic material that is adapted to be inserted into an opening of a sheet-like support member, wherein the opening deviates from a circle (e.g. rectangular shape). The grommet comprises a shank having an inner axial receiving bore for an element having an outer thread and snapping means on the outer circumference which cooperate with an edge of the receiving opening. However, once snapped into place (i.e. through the opening passed the snapping lugs), the grommet has to be rotated (by a small angle) to lockingly align the shoulder/surface portions of the grommet with respective edges of the opening. Also, the disclosed screw grommet does not appear to be sufficiently adaptable to different thicknesses of the panel.

Therefore, it is an object of the present invention, to provide an improved fastener that can be lockingly engaged without the need of a tool or a user having to manually rotate the fastener into locking engagement, therefore improving the ease of use and minimising installation time, as well as, overall assembly costs. Further, it is an object of the present invention to provide an improved fastener adapted to operably accommodate more than one component thickness.

SUMMARY OF THE INVENTION

According to a first aspect of the present invention there is provided a fastener for coupling a first component to a mounting hole of a second component, the fastener comprising:

a central body portion, insertable through the mounting hole of the second component, having a distal end and a proximal end, and a central axis between said distal end and said proximal end;

a head portion, provided at said proximal end of said central body portion, configured to stoppingly engage with an upper surface of the second component, during use;

at least two resilient ribs, protruding radially outward from an outer surface of said central body portion, adapted to rotatingly bias said central body portion about said central axis when operably engaged with the mounting hole of the second component, during use;

at least a first pair of diametrically opposed recessed surfaces, provided at said proximal end of said central body, extending axially between said head portion and a respective shoulder portion formed by each one of said first pair of recessed surfaces towards said distal end, each one of said first pair of recessed surfaces is circumferentially spaced apart from a respective one of said at least two resilient ribs about said central axis and adapted to lockingly engage with the second component, during use, and wherein said at least two resilient ribs extend along said outer surface of said central body portion in a direction along said central axis between said distal end and said proximal end, and axially past said respective shoulder portion.

This provides the advantage that a fastener can be inserted into a mounting hole and fixed in position without the need for an external rotatory force to be applied. In particular, the specific arrangement and design of the opposing resilient ribs provides for a rotational force applied to the central body portion about its central axis when inserted in and engaging with the mounting hole of the second component. This rotational bias/force is then utilised to snappingly move the fastener into a locking position when the central body portion is fully pushed into the mounting hole aligning the edges of the mounting hole with the recessed surfaces. Therefore, the fastener is automatically moving/rotating into the locking position without further (rotating) interaction from the user, i.e. the user action is simply unidirectional (e.g. axial push). In addition, the instant release of the rotational biasing force when reaching the recessed surfaces may provide an audible snapping sound indicating to the user that the fastener is correctly inserted into the mounting hole.

Advantageously each one of said at least two resilient ribs may be tapered towards said distal end of said central body portion. This provides the advantage of gradually increasing the rotational biasing force provided by the resilient ribs when moving the fastener into the mounting hole, making the initial insertion of the fastener easier.

Advantageously, a proximal end portion of each one of said at least two resilient ribs may be tapered towards said proximal end of said central body portion from a point longitudinally aligned with said shoulder portion of at least said first pair of recessed surfaces towards said proximal end of said central body portion. The tapering of the proximal end of the resilient rib(s) provides the advantage of an additional force vector acting between the rib(s) and edge of the mounting hole, pushing the fastener further into the mounting hole when rotatingly lock into engagement with the recessed surfaces.

Preferably Advantageously, said proximal end portion of each one of said at least two resilient ribs is movable relative to said head portion.

Advantageously, said fastener may comprise at least a second pair of diametrically opposed recessed surfaces, each one of said second pair of recessed surfaces is axially adjacent to and radially offset from a respective one of said first pair of recessed surfaces.

Preferably, a cross-sectional area of said central body portion defined by at least said first pair of recessed surfaces may be greater than a cross-sectional area of said central body portion defined by at least said second pair of recessed surfaces. This provides the advantage that the fastener may be used with structures (e.g. panels) of different thickness. I.e. shoulder portions of the recessed surfaces at different axial levels will accommodate for different thicknesses when locking the fastener into place.

Advantageously, said central body portion may have a substantially polygonal cross-section.

Advantageously, said central body portion may further comprise at least two diametrically opposed longitudinal recesses, each one configured to accommodate a respective one of said at least two resilient ribs. Preferably, each one of said at least two resilient ribs may protrude divergingly away from an inner surface of a respective one of said at least two diametrically opposed longitudinally recesses of said central body portion. This provides the advantage of aligning respective resilient ribs into a predetermined mutually cooperating direction (e.g. both opposing ribs are aligned towards a clockwise or anticlockwise direction) so that the rotational biasing force of each one of the opposing resilient ribs is acting in the same direction, therefore minimising the risk of the resilient ribs bending in opposite directions when inserted into the mounting hole each providing a biasing force counteracting the other.

Advantageously, said head portion may comprise a resilient sealing member operably overmould onto a peripheral edge of said head portion and adapted to sealingly engage with the upper surface of the second component, during use. This provides the advantage of an additional seal between the panel structure and the fastener, as well as, an axial bias onto the locking shoulder portions of the recessed surfaces so as to maintain a tight engagement between the fastener and the panel structure.

BRIEF DESCRIPTION

Embodiments of the invention are further described hereinafter with reference to the accompanying drawings, in which:

FIG. 1 illustrates (a) an example embodiment of a fastener of the present invention and (b) a simplified example of a panel structure and respective mounting hole;

FIG. 2 illustrates an enlarged portion of the fastener of FIG. 1 (a) disengaged and (b) engaged with the mounting hole of the panel structure shown in FIG. 1;

FIG. 4 illustrates (a) a partial cross-sectional view of the sealing member coupled to the head portion and (b) a cross-sectional view of an enlarged portion of the head portion of the fastener of FIG. 1;

DETAILED DESCRIPTION

The present invention relates to a fastener for coupling a first component to a mounting hole of a second component. For example, in this particular example, the fastener of the present invention is used to attach a flat panel component to a vehicle structure (e.g. chassis) comprising suitable mounting holes or opening.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description. The terms 'distal', 'proximal', 'medial', 'lateral' designate directions of the component features according to its normal use.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner. Like reference numerals are used to depict like features throughout.

Also, the mounting hole of the second component may be a cavity shaped to receive the fastener and is sized/dimensioned so as to tightly receive the fastener. When the fastener is in the 'in-use' position, the fastener is lockingly engaged with the mounting hole, i.e. the 'in-use' position of the fastener is the final position the fastener achieves during the insertion process. Further, it should be understood that although the mounting hole has a square shape, any suitable shape capable of retaining the corresponding fastener may be used.

Throughout the description reference is made to a proximal end 150 and a distal end 160 of a fastener 100. The distal end 160 is understood to be the end portion of the fastener 100 which is first inserted into a mounting hole 201, wherein the proximal end 150 is understood to be the end portion of the fastener engaged by the user.

Figure 1:
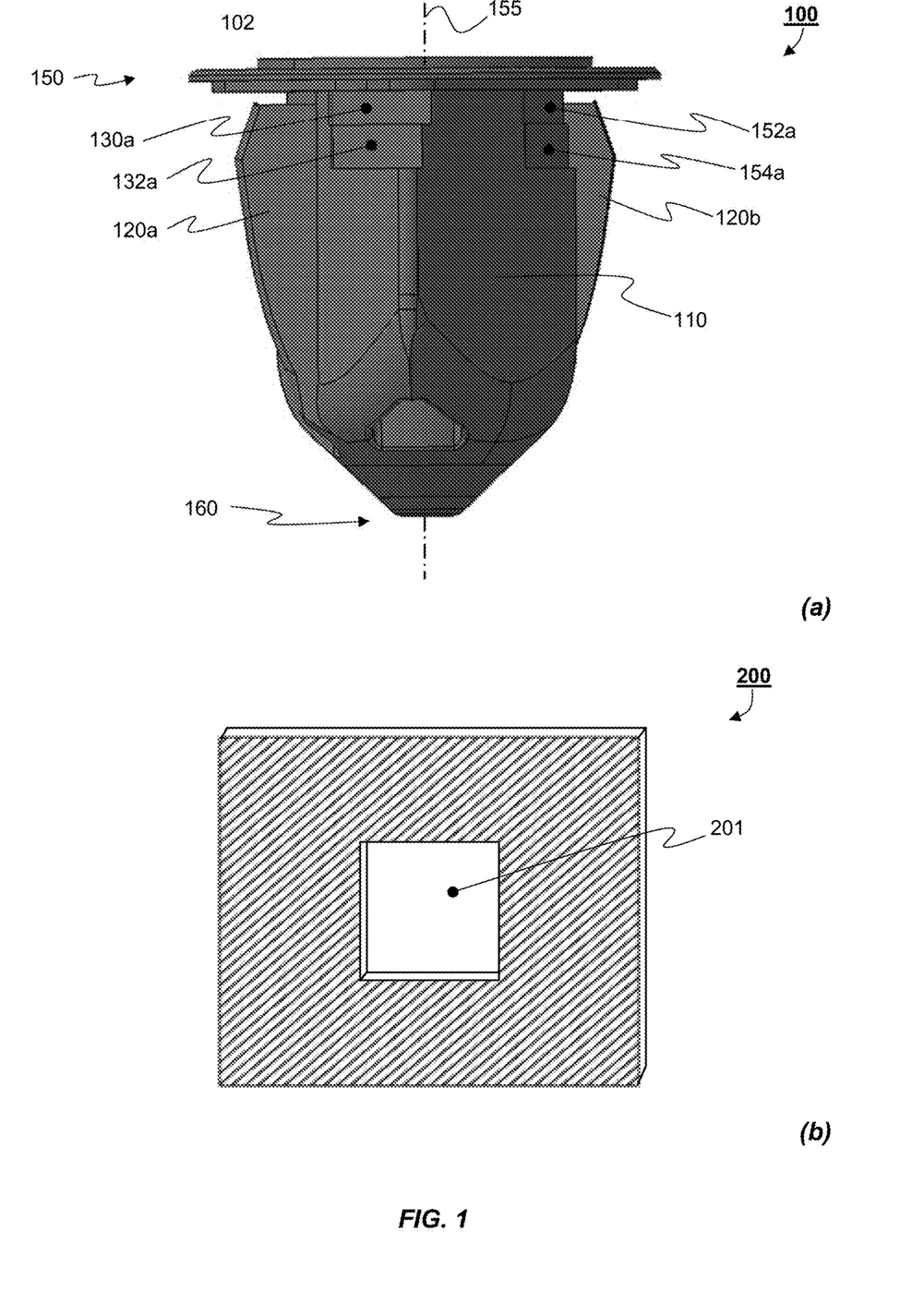

Referring now to FIG. 1(a), a first example embodiment of the fastener 100 of the present invention comprises a central body portion 110 extending along a longitudinal central axis 155 and a head portion 102 that is provided at a proximal end of and coaxial with the central body portion 110.

The central body portion 110 of this particular example embodiment has a substantially polygonal cross-section suitable to fit through a correspondingly matching mounting hole 201 (see FIG. 1(b)), but large enough to prevent rotation of the central body portion 110 about its central axis 155 when passing through the mounting hole 201. However, it is understood by the person skilled in the art, that the cross-sectional shape of the central body portion 110 may take any form suitable to operably engage with a corresponding mounting hole 201, which may also have any suitable shape to operably receive the central body portion 110. Examples of the cross-section shape may include, but is not limited to, circular, triangular, cuboidal, pentagonal and hexagonal. In this example the central body portion 110 has a substantially square "footprint" (see, for example, FIG. 2).

The central body portion 110 further includes two radially opposing substantially planar ribs 120a, 120b, each one protruding away from and extending longitudinally along the outer surface of the central body portion 110 between its distal end portion 160 and proximal end portion 150.

Figure 2:
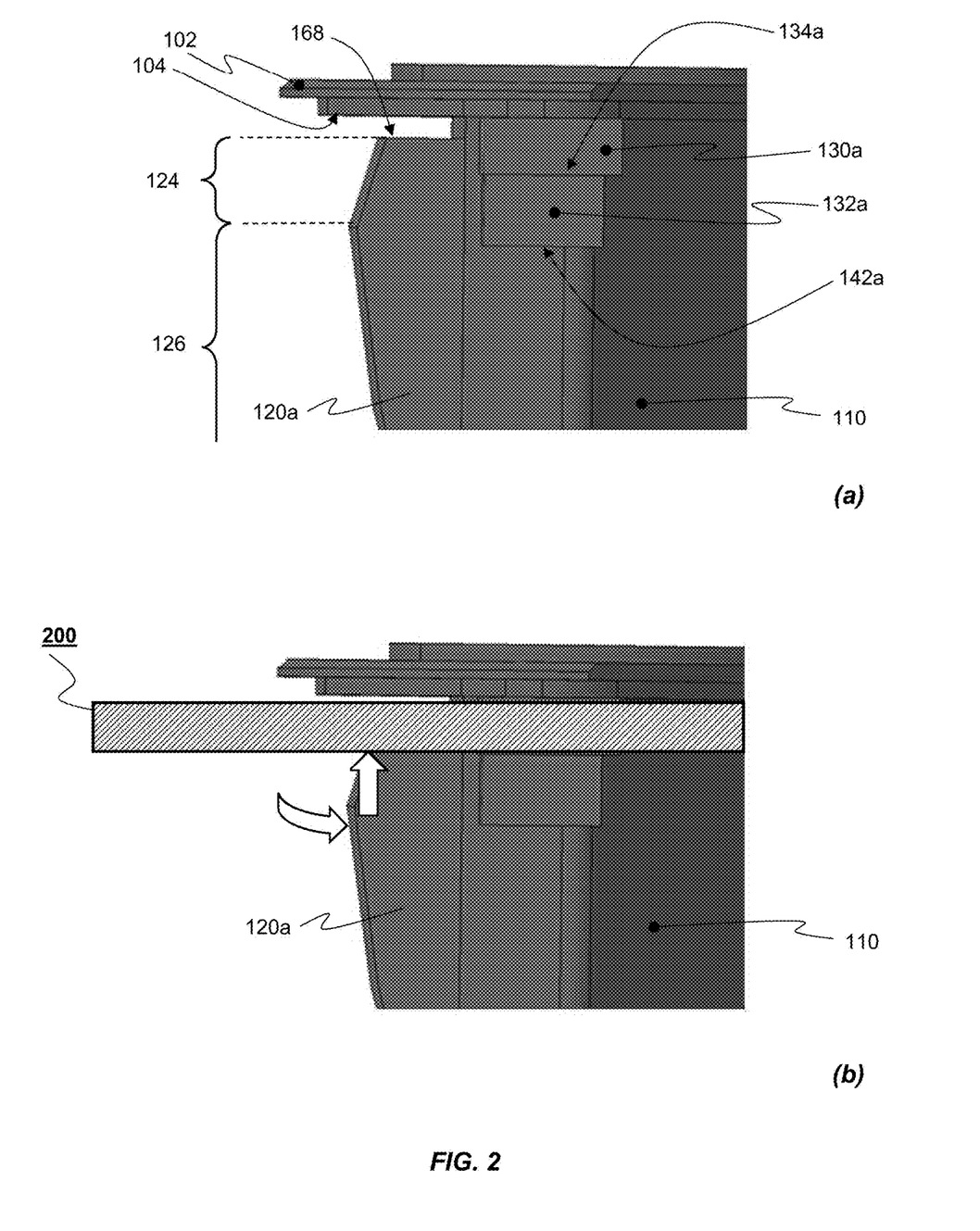

As shown in more detail in FIGS. 2 (a) and (b), each one of the two opposing ribs 120a, 120b comprises an upper portion 124 and a lower portion 126. Each one of the upper and lower portion 124, 126 of the ribs 120a, 120b is tapered (i.e. declined) towards respective proximal 150 and distal 160 end portion of the central body portion 110, so as to form an apex 128 on an outer edge of the ribs 120a, 120b between the upper 124 and lower portion 126. The upper edge 168 of the upper portion 124 of each one of ribs 120a, 120b may be substantially flat, i.e. substantially perpendicular to the central axis 155. In this way tapering of the upper portion 124 may be interrupted, so as to form an axial gap between the ribs 120a, 120b and the lower surface 104 of the head portion 102. The ribs are formed of a resilient material such that they are capable of elastic deformation. Any suitable materials may be used, including, but not limited to, polymers, such as, silicone and rubber, and metals or any other suitable composite or compound material.

A first pair (i.e. two) of diametrically opposed recessed surfaces 130a, 130b is provided at the proximal end portion 150 of the central body portion 110, each one of the first pair of diametrically opposed recessed surfaces 130a, 130b is circumferentially spaced apart (i.e. angular displacement about the central axis 155) from a respective one of said ribs 120a, 120b. Any suitable angular displacement of the diametrically opposing recessed surfaces 130a, 130b may be used to enable locking engagement between the fastener 100 and the panel 200, e.g. between 5° and 60° (angular degrees). Further, each one of the first pair of diametrically opposed recessed surfaces 130a, 130b is 'stepped-in' from the outer surface of the central body portion 110 towards the central axis 155 by a predetermined first distance, forming respective first shoulder portions 134a, 134b that are adapted to lockingly engage with a lower surface of a first panel 200 during installation.

A second pair (i.e. two) of diametrically opposed recessed surfaces 132a, 132b may be provided axially adjacent to a respective recessed surface of the first pair of recessed surfaces 130a, 130b. The second pair of recessed surfaces 132a, 132b is radially offset from the first pair of recessed surfaces 130a, 130b, i.e. each one of the second pair of recessed surfaces 132a, 132b is 'stepped-in' from the outer surface of the central body portion 110 towards the central axis 155 by a predetermined second distance that is smaller than the predetermined first distance, forming respective second shoulder portions 142a, 142b adapted to lockingly engage with a lower surface of a second panel 200 (e.g. one that is thicker than the panel engaging with the first pair of recessed surfaces 130a,b), during installation. It is understood by the person skilled in the art that the two different adjacent pairs of recessed surfaces 130a,b and 132a,b provide for suitable locking engagement with panels 200 of different thicknesses, i.e. a thinner panel structure will engage with the first pair of recessed surfaces 130a, and 130b, and a thicker panel structure will engage with the second pair of recessed surfaces 132a, 132b.

Further, each one of respective first and second shoulder portions 134a,b and 142a,b is axially arranged to be within the length of respective ribs 120a,b, i.e. the proximal end (i.e. upper edge 168) of each one of the ribs 120a,b extends at least past the respective first shoulder portions 134a,b.

Figure 3:
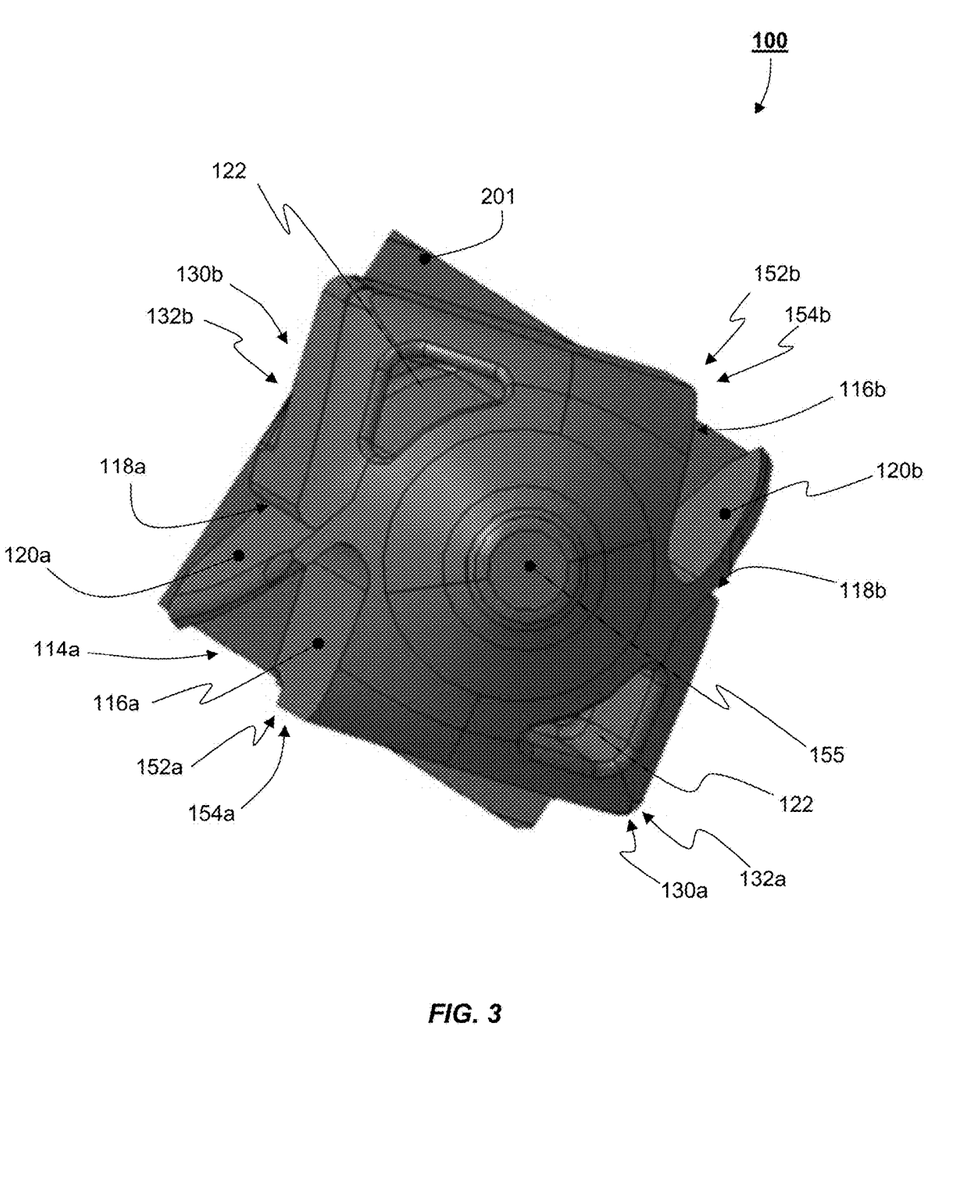
FIG. 3 illustrates a top view of the fastener of FIG. 1 lockingly engaged within the mounting hole of the panel structure.

Additionally, a third and/or fourth pair of diametrically opposed recessed surfaces 152a,b and 154a,b may be provided at the proximal end 150 of the central body portion 110 that are arranged orthogonal to the first and second pair of diametrically opposed recessed surfaces 130a,b and 132a,b, i.e. angularly offset by 90° (angular degrees) about the central axis 155 (see FIG. 3). The third and fourth pair of diametrically opposed recessed surfaces 152a,b and 154a,b may be substantially the same as the first and second pair of diametrically opposed surfaces 130a,b and 132a,b. However, the predetermined 'stepped-in' distances for the third and fourth pair of diametrically opposed recessed surfaces 152a,b and 154a,b may differ from respective one of the first and second pair of diametrically opposed recessed surfaces 130a,b and 132a,b, e.g. the 'stepped-in' distances from the outer surface of the central body portion 110 may be smaller than the 'stepped-in' distances of the equivalent first and second pair of diametrically opposed recessed surfaces 130a,b and 132a,b. The additional third and/or fourth pair of diametrically opposed recessed surfaces 152a,b and 154a,b may improve the functionality of the fastener 100 during use, especially when the space between the central body portion 110 and the mounting hole 201 is relatively 'tight' (i.e. not allowing much scope for rotational movement).

Referring now to FIG. 3, the central body portion 110 further comprises two diagonally opposite longitudinal cut-out sections 114a and 114b, each one suitable to accommodate a respective one of the ribs 120a and 120b. In particular, the longitudinal cut-out sections 114a,b are shaped so as to form an inverted corner having substantially orthogonal first 116a,b and second 118a,b walls. In this particular example embodiment, each one of the ribs 120a and 120b is protruding from a respective one of the second wall 118a,b of the longitudinal cut-out 114a,b at an angle diverging from the first wall 116a,b. This provides for ribs 120a,b that are pre-aligned towards the intended deflection direction, before the fastener 100 is inserted into the mounting hole 201, i.e. the risk of accidentally deflecting opposing ribs 120a and 120b into counteracting directions when inserting the fastener 100 into the mounting hole 201 is minimised.

Further, a cavity 122 may be provided in the central body portion 110, for example, to reduce weight or to provide an outlet for airflow when pushing the fastener into the mounting hole 201.

Figure 4:
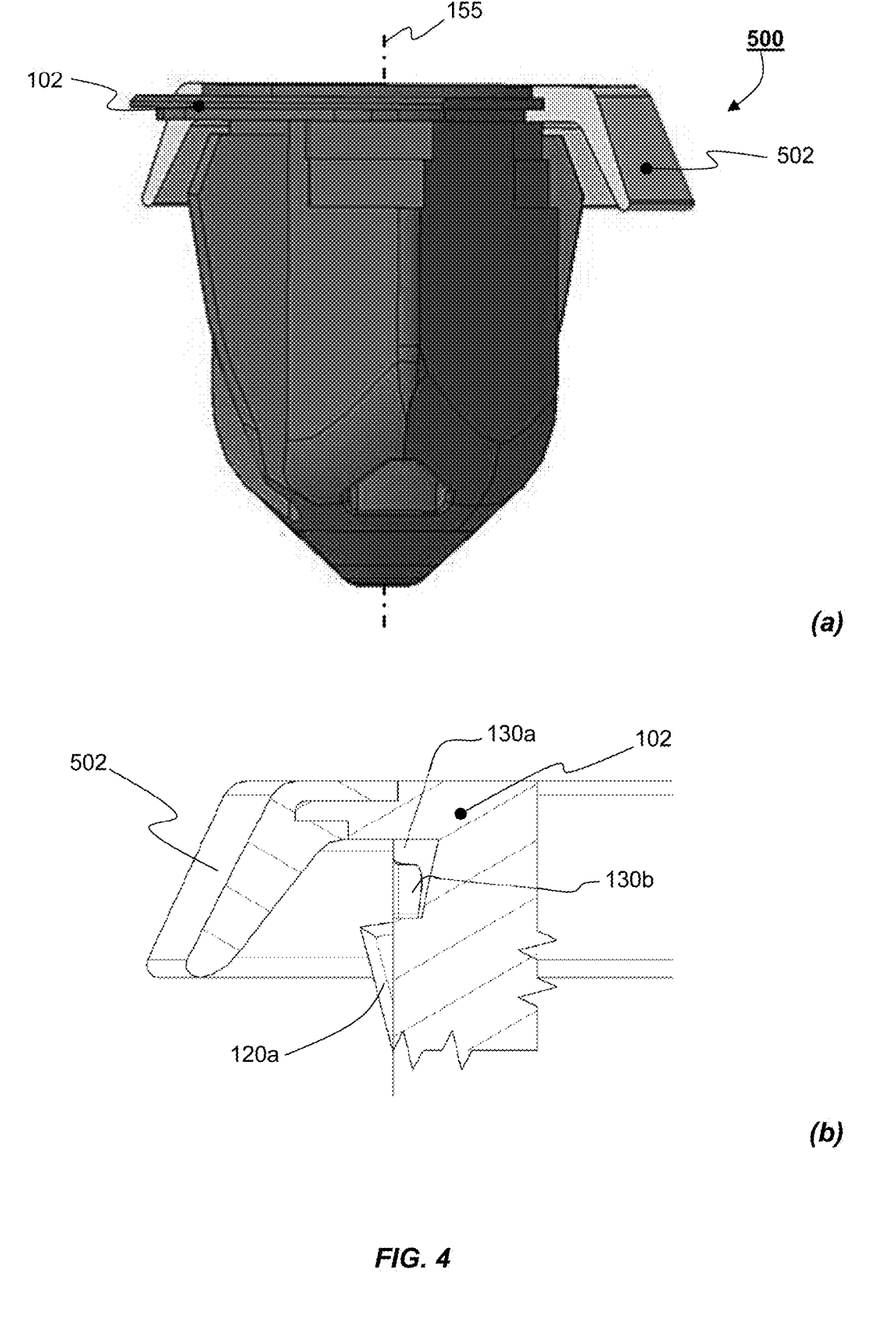

Referring now to FIG. 4, the head portion 102 of the fastener 100 comprises a substantially planar surface (e.g.

circular shape) that is perpendicular to the central axis 155 of the central body portion 110 and which is adapted to abuttingly engage with the upper surface of the panel 200 when the fastener 100 is inserted into the mounting hole 201. In particular, the shape and/or cross-sectional area covered by the head portion 102 is suitable to prevent the head portion 102 from moving through the mounting hole 201.

Further, in this particular example embodiment, a sealing member 500 may be coupled to the outer rim of the head portion 102, so as to provide a fluid seal and/or a resilient bias between the fastener 100 and the panel 200, when in use (i.e. when the fastener 100 is inserted and lockingly engaged within the mounting hole 201). The sealing member 500 may be made from a resilient material, such as, but not limited to, a polymer material (e.g. elastomer, silicon, rubber). The sealing member 500 may be permanently or removably moulded onto the peripheral edge of the head portion 102. This particular sealing member 500 may comprise a lip portion 502 protruding laterally outward and towards the distal end of the central body portion 110.

Figure 5:
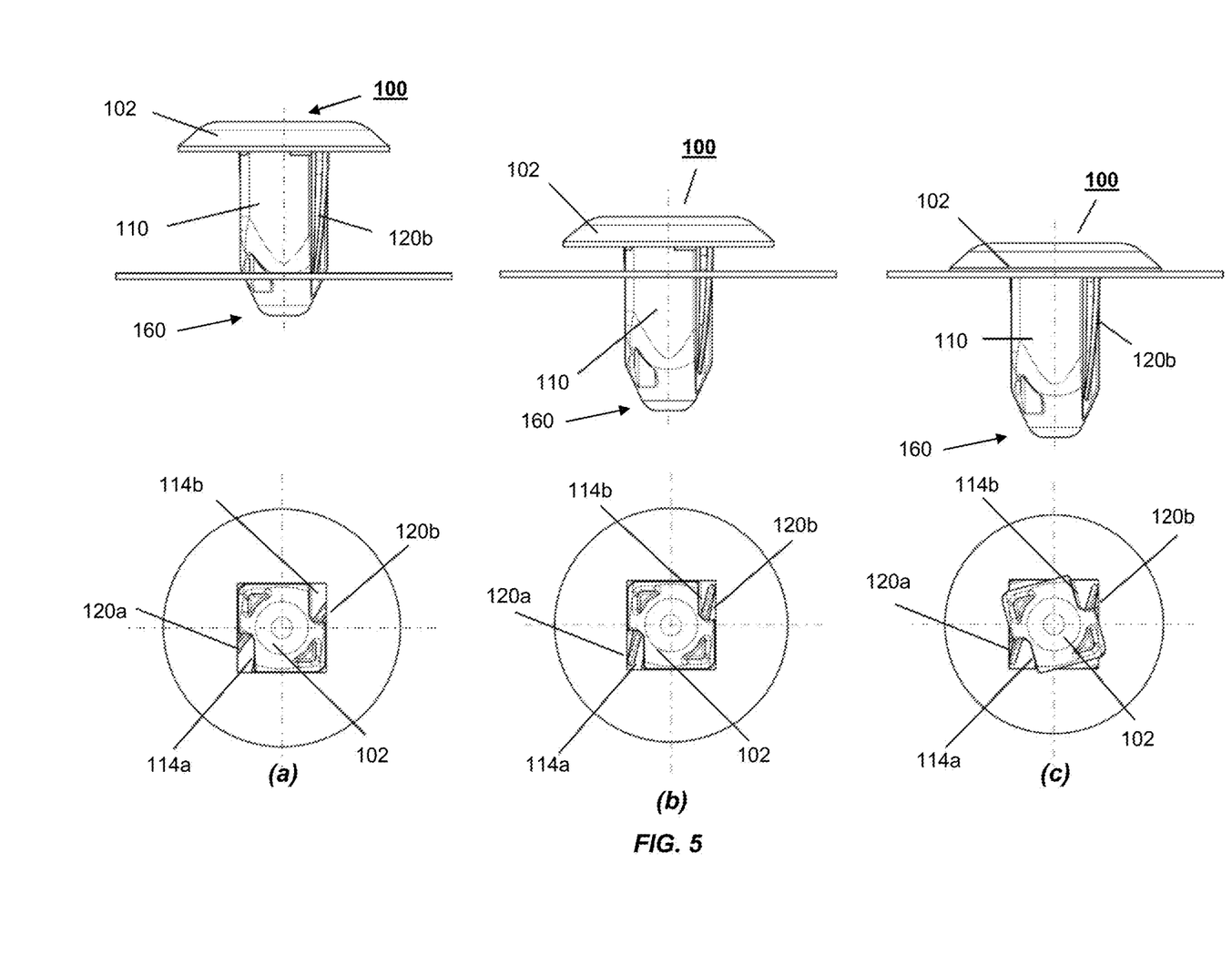
FIG. 5 illustrates the insertion process from a side view and from a bottom view, in three stages (a) the distal end of the fastener is entering the mounting hole of the panel structure, (b) the central body portion of the fastener is pushed into the mounting hole of the fastener before locking into engagement with the panel structure, and (c) the fastener is rotated into locking engagement with the panel structure.

Referring now to FIGS. 5 (*a*) to (*c*), different stages during insertion of the fastener 100 into the mounting hole 201 are illustrated in front view and bottom view (i.e. from the distal end during installation).

FIG. 5 (*a*) shows the fastener 100 in the first stage when entering the mounting hole 201 of a panel structure 200. Here, the distal end 160 of the central body 110 is just entering into the mounting hole 201 axially aligned with the centre of the mounting hole 201, so as to fit the matchingly shaped central body portion 110 and pre-aligned resilient ribs 120*a,b* into the mounting hole 201. The user (or robot, for example, in an assembly line) will normally push the head portion 102 of the fastener 100 with a linear force (along the central axis 155) that is sufficient to overcome the friction force between the edge of the mounting hole 201 and the resilient ribs 120*a,b*. The tapered design of the ribs 120*a,b* ensures an increasing deflection of the ribs 120*a,b* with increasing insertion of the central body portion 110, gradually increasing the rotational biasing force onto the central body portion 110 about its central axis 155.

FIG. 5 (*b*) shows the fastener 100 in a second stage, i.e. close to full insertion into the mounting hole 201 of the panel structure 200. Here, the deformation of the ribs 120*a,b* has increased close to its maximum, resulting in a torque about the central axis 155 that is close to the maximum force that can be provided by the deflected ribs 120*a,b*. Further insertion will eventually move the shoulder portions 142*a,b* or 134*a,b* of the first or second pair of recessed surfaces 130*a,b* and 132*a,b* of the fastener 100 passed the panel surface, allowing instant release of at least a portion of the rotational bias provided from the deflected ribs 120*a,b* to rotate the central body portion 110 within the mounting hole 201. Further insertion of the central body portion 110 engages the tapering of the upper portion 124 of the ribs 120*a,b* with the edge if the mounting hole 201, providing an additional direction of the force component provided by the deflected ribs 120*a,b* so as to 'urge' the fastener 100 further into the mounting hole 201 (see FIG. 2(*b*)). In particular, the deflection of the ribs 120*a*, 120*b* allows the remaining rotational bias (i.e. after the fastener has rotated into a locking engagement with the panel structure) to provide an upwards force acting on the peripheral edge of the mounting hole 201.

FIG. 5 (*c*) shows the fastener 100 in a third stage, i.e. where the fastener 100 is lockingly engaged within the mounting hole 201 of the panel 200. That is, the fastener 100 is rotated into engagement with the diametrically opposed recessed surfaces 130*a,b* or 132*a,b*, and (if the embodiment comprises additional pair(s) of recessed surfaces) 152*a,b* or 154*a,b*. At this stage, the sealing member 500 of the head portion 102 is engaged with the upper surface of the panel 200 to provide a fluid seal around the mounting hole 201.

The rotation required to lockingly engage the fastener may be ⅛ of a turn. Also, the sudden turn of the central body 110 may result in an audible snap or click noise indicating the correct installation of the fastener 100.

All three stages (a), (b) and (c) may be one continuous and smooth movement without the need of any external tool to provide the torque when locking the fastener into the mounting hole 201.

Alternative Embodiments

Figure 6:
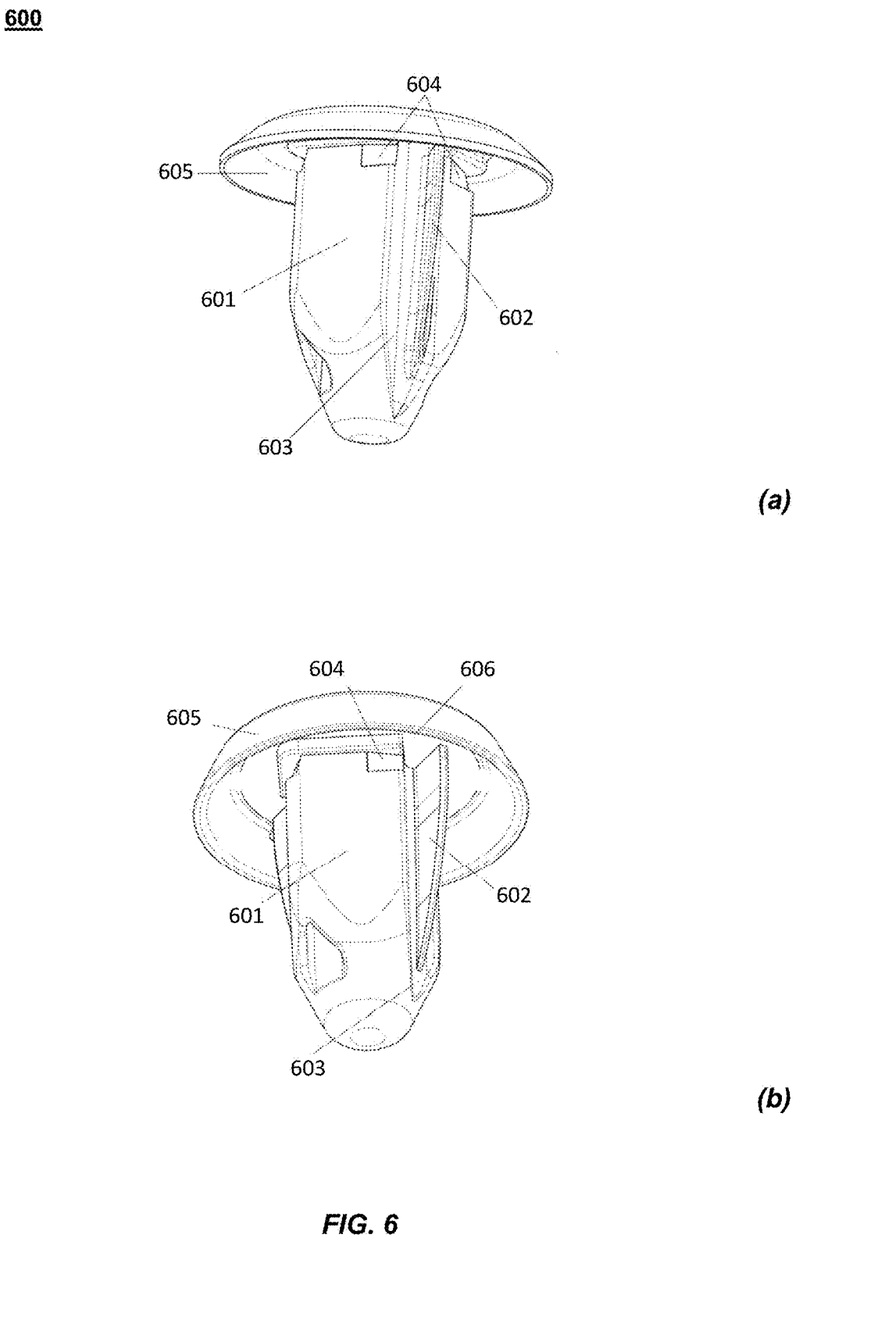
FIG. 6 illustrates different views (a) and (b) of another example embodiment of the present invention comprising two pairs of circumferentially spaced apart recess surfaces and ribs tapered towards the distal end.

Referring now to FIGS. 6 (*a*) and (*b*), a further example embodiment of the fastener 600 is shown from two different viewpoints. In this example the fastener 600 includes two pairs of recessed notches 603 on either side of the rib 602. The fastener 600 comprises a central body portion 601 that is inserted inside the hole and an abutment head portion with sealing member 605 provided at one end (proximal) of the central body 601 and that abuts the sheet or panel surface when the fastener is placed in its use position.

In this example, the central body 601 defines a longitudinal axis, which matches with the insertion direction of the fastener and the cross-section of said central body 601 is substantially polygonal, e.g. square, except for the presence of notches in e.g. two of their corners, according to the shown embodiment.

At each notch 603 a rib 602 is placed that extends longitudinally substantially along the whole length of the central body 601.

Further, in this example, the rib(s) 602 are displaced from said longitudinal axis of the central body 601, and also the plane defined by each rib 602 is displaced from the longitudinal axis.

For facilitating the insertion of the ribs 602 inside the hole, the ribs 602 are wider at one end (proximal) than at the other (distal), i.e. the ribs 602 are narrower at their distal end.

The central body 601 also comprises at least two slots 604 (i.e. recessed surfaces), that are placed at the end of the central body 601 that is proximal to the abutment body 605, and one end of each rib 602 is at the same height of the central body 601 than one edge of said slots 604 (see FIG. 6(*b*)).

The insertion process of the fastener 600 according to this example embodiment of the present invention into a hole is the following:

First, a vertical force is applied, for inserting the central body 601 inside the hole.

When the central body 601 contacts the hole, the ribs 602 bend backwards and make a force to the walls of the hole, making a torque due to the distance between the ribs 602 and the longitudinal axis of the central body 601.

As the cross-section of the central body 601 and the hole have the same (or similar) shape, the central body 601 cannot turn until the sheet arrives to the slots 604, and then the central body 601 rotates, e.g. ⅛ of turn. If there is not any external turning force that blocks the central body 601, the ribs 602 are in contact with hole, so they prevent the disassembly of the fastener.

Figure 7:
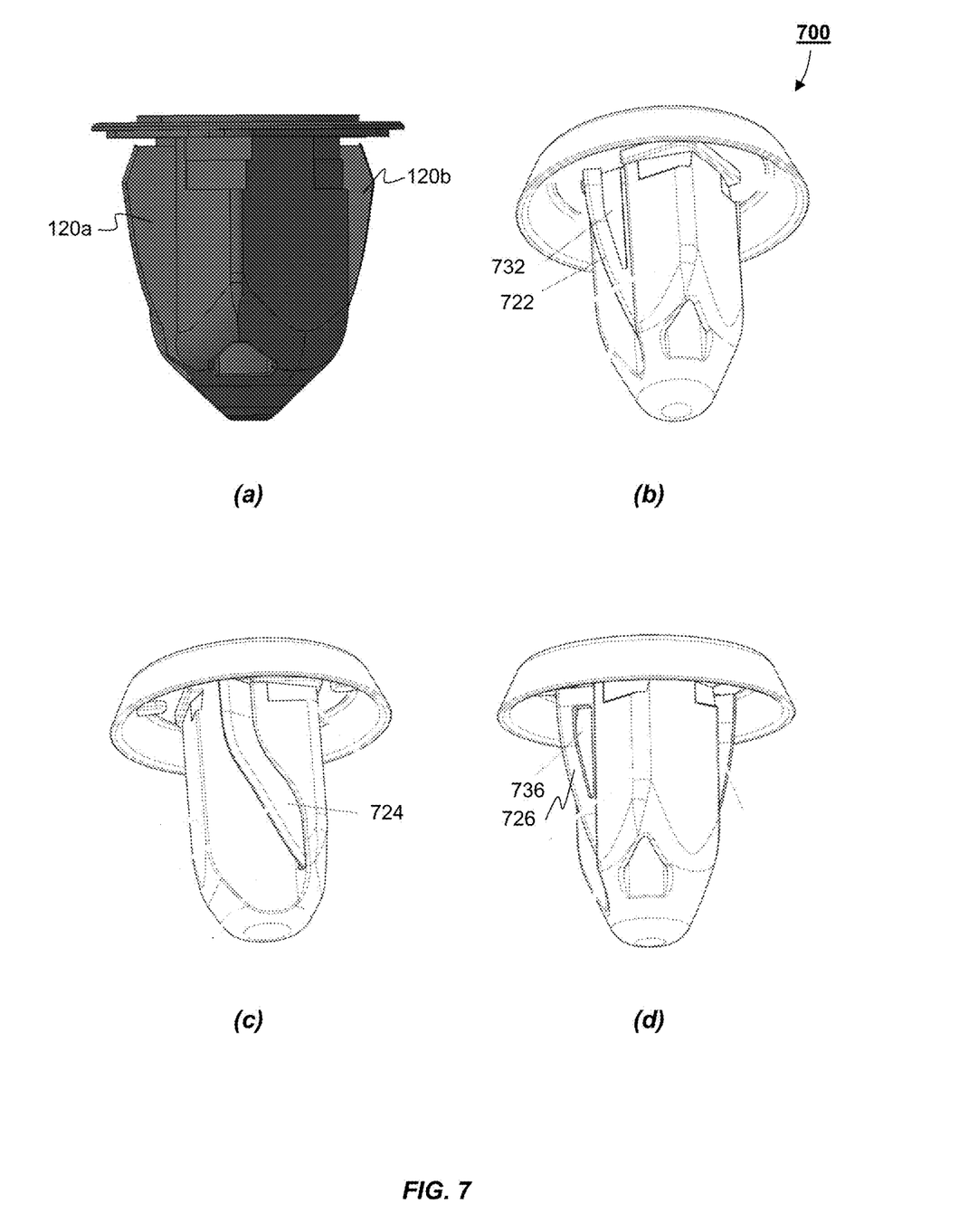
FIG. 7 illustrates different example embodiments of the fastener of the present invention comparing the rib design of (a) the fastener of FIG. 1 with alternative rib designs shown in (b) with cut-out portion, (c) a curved rib along a curved recess surface and (d) with aperture.

Referring now to FIGS. 7 (*a*) to (*d*), example embodiments of fasteners with different rib design 120, 722, 724, 726 are illustrated. Here, FIG. 7(*a*) shows the rib 120*a,b* of the fastener of FIG. 1. FIG. 7(*b*) shows a rib 722 with a central recess 732 extending from the proximal end towards the distal end of the rib 722. FIG. 7(c) shows a rib 724 with a curved outer edge, and FIG. 7(d) shows a rib 726 with a central aperture 736.

Figure 8:
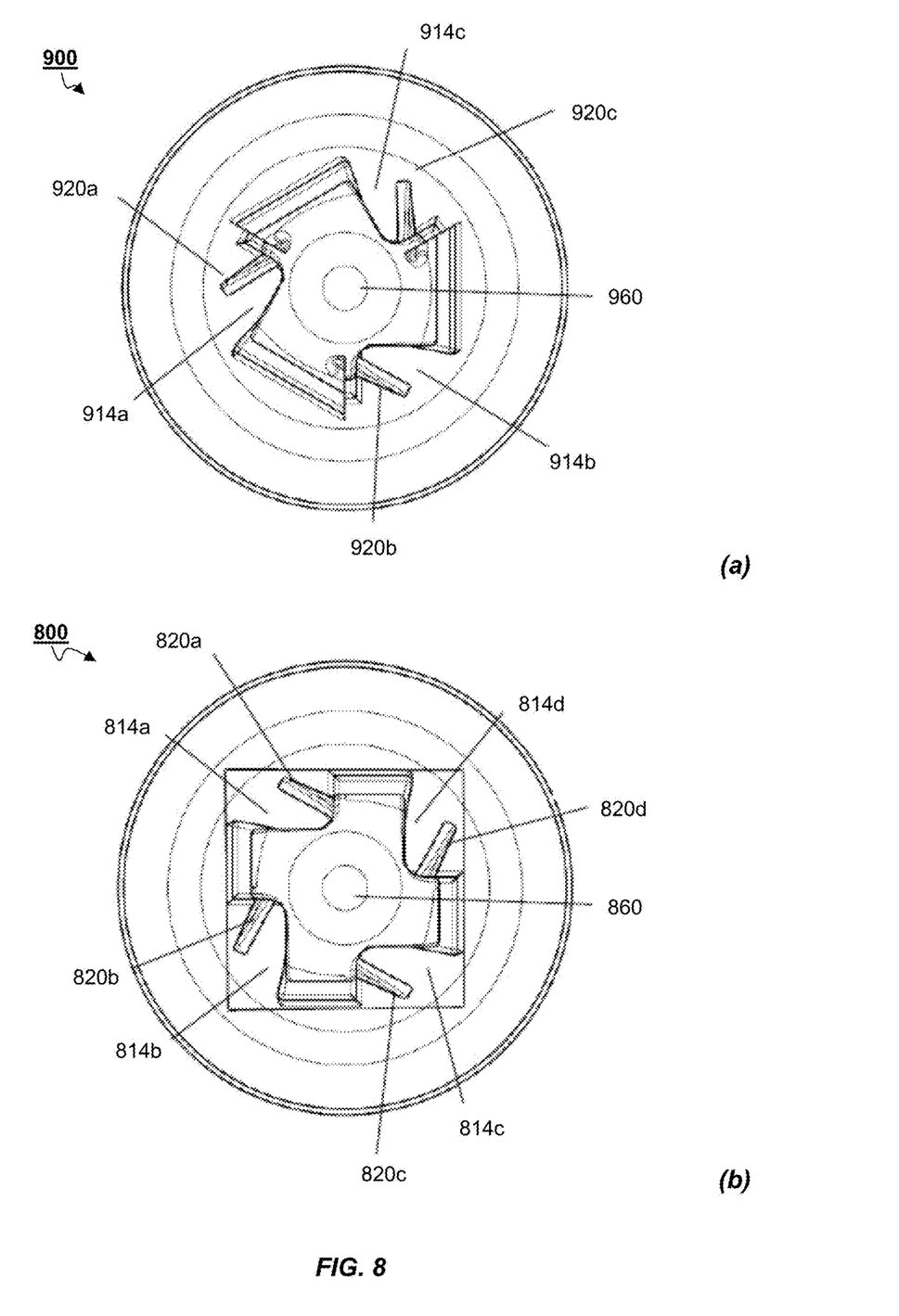
FIG. 8 illustrates a bottom view of alternative example embodiments of the fastener of the present invention (a) having three ribs equidistantly spaced apart and (b) having four ribs equidistantly spaced apart.

Referring now to FIG. 8, a bottom plane view of example embodiments of the fastener 800, 900 of the present invention is illustrated. The fastener 800, 900 may have any suitable number of ribs 820a,b,c, or 920a,b,c,d. In particular, the fastener 900 has three circumferentially equidistantly spaced ribs 920a-c, whereas the fastener 800 has four circumferentially equidistantly spaced ribs 820a-d. Other than the additional ribs 820a-d, 920a-c and respective recessed portions 814a-d, 914a-c, the fasteners 800, 900 are equivalent to the fastener 100 described with reference to FIG. 1 and will not be described in any more detail.

Figure 9:
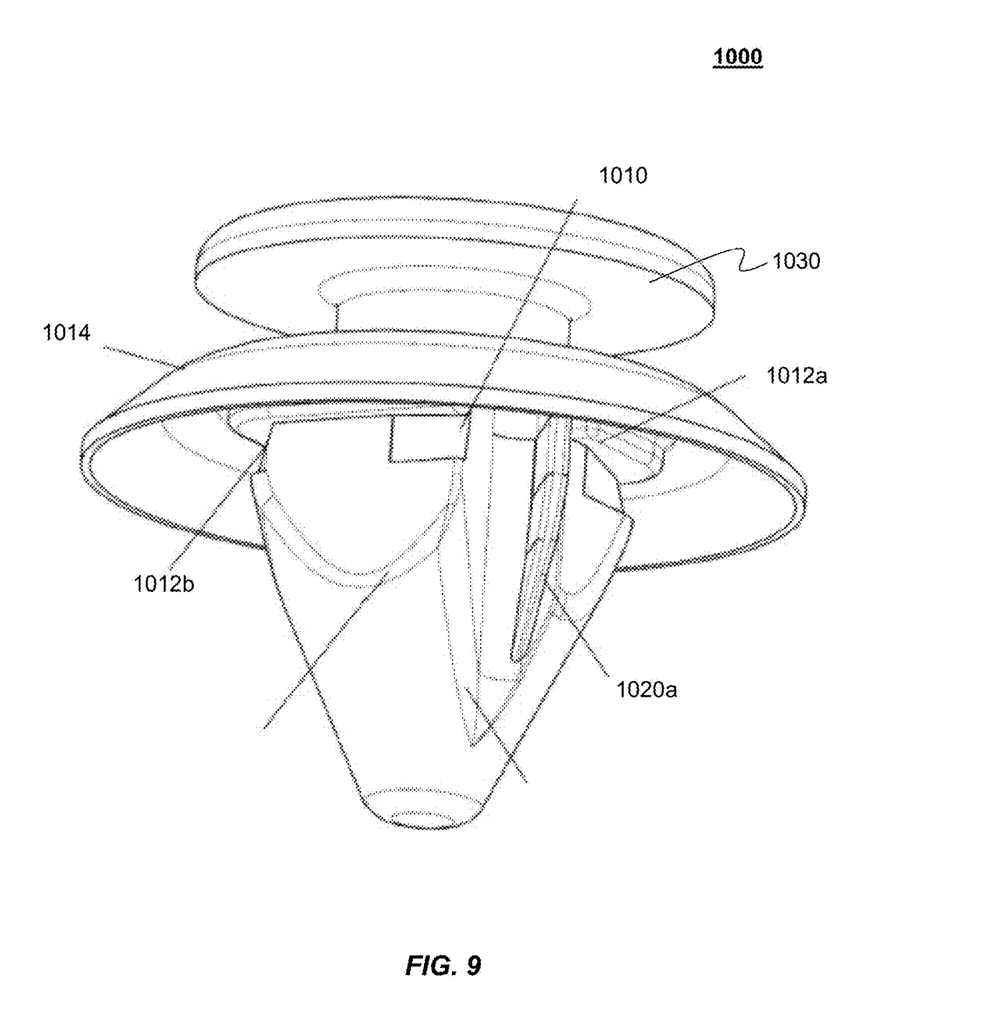
FIG. 9 illustrates another alternative example embodiment of the fastener of the present invention.

Referring now to FIG. 9, another alternative example embodiment of the fastener 1000 of the present invention is shown. Here the fastener 1000 comprises pairs of recessed surfaces 1010a, 1012a and 1012b provided on either side of the rib(s) 1020a. Further, the fastener 1000 comprises an additional user engagement member 1030 axially protruding from the head portion 1014 of the fastener 1000.

Various modifications to the detailed designs as described above are possible. For example, although described as a rib, the protrusion from the central body may take any suitable protruding form, for example a leg, a wing, or a fin.

Although depicted in some of the figures as having distinct vertices, the tapering of the ribs may equally be smooth. The ribs may be in any suitable form which produces a resultant torque force when the fastener is pushed through a mounting hole.

Although described as having two axially adjacent recessed surfaces, the fastener may have any number of axially adjacent pairs of recessed surfaces to accommodate different thicknesses of the panel structure.

Although the rotation of the fastener is described to be ⅛ of a turn, any suitable rotation is envisaged, for example ⅓, ¼ turn etc. The resultant rotation of the fastener will be dependent on the size, number and projection direction of the ribs.

Further Examples

Further examples are encompassed by the below clauses:
1. Fastener comprising a central body (1) defining a longitudinal axis, characterized in that the central body (1) comprises at least two ribs (2) which are displaced from said longitudinal axis.
2. Fastener according to clause 1, wherein each rib (2) extends along substantially the whole length of the central body (1).
3. Fastener according to clause 1, wherein the ribs (2) are placed in corresponding notches (3) of the central body (1).
4. Fastener according to clause 1, wherein the central body (1) comprises at least two slots (4) placed at one of the ends of said central body (1).
5. Fastener according to clause 4, wherein said slots (4) extend perpendicular with respect to the longitudinal axis of the central body (1).
6. Fastener according to clause 4, wherein each slot (4) has an internal surface (7) that is inclined with respect to a pressing area (6) of the central body (1).
7. Fastener according to clause 1, wherein the cross-section of the central body (1) has a substantially polygonal shape.
8. Fastener according to anyone of clauses 1-4, wherein each rib (2) is wider at one of its ends than at the other end.
9. Fastener according to anyone of the previous clauses, wherein each rib (2) defines a plane, said plane being displaced with respect to the longitudinal axis of the central body (1).
10. Fastener according to clause 1, wherein each rib (2) is in contact with an upper portion of the central body (1).
11. Fastener according to clause 1, wherein each rib (2) has a curved shape.
12. Fastener according to clause 1, wherein each rib (2) comprises at least one hole (10).

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:
1. A fastener for coupling a first component to a mounting hole of a second component, the fastener comprising:
 a central body portion, insertable through the mounting hole of the second component, having a distal end and a proximal end, and a central axis between said distal end and said proximal end;
 a head portion, provided at said proximal end of said central body portion, configured to stoppingly engage with an upper surface of the second component, during use;
 at least two resilient ribs, protruding radially outward from an outer surface of said central body portion;
 at least a first pair of diametrically opposed recessed surfaces, each of which is recessed into the central body and provided at said proximal end of said central body, extending axially between said head portion and a respective shoulder portion formed by each one of said first pair of recessed surfaces towards said distal end, each one of said first pair of recessed surfaces is circumferentially spaced apart from a respective one of said at least two resilient ribs about said central axis and adapted to lockingly engage with the second component, during use, and
 wherein said at least two resilient ribs extend along said outer surface of said central body portion in a direction along said central axis between said distal end and said proximal end, and axially past said respective shoulder portion.
2. A fastener according to claim 1, wherein each one of said at least two resilient ribs is tapered towards said distal end of said central body portion.
3. A fastener according to claim 2, wherein a proximal end portion of each one of said at least two resilient ribs is tapered towards said proximal end of said central body portion from a point longitudinally aligned with said shoulder portion of at least said first pair of recessed surfaces towards said proximal end of said central body portion.
4. A fastener according to claim 3, wherein said proximal end portion of each one of said at least two resilient ribs is movable relative to said head portion.
5. A fastener according to claim 1, comprising at least a second pair of diametrically opposed recessed surfaces, each one of said second pair of recessed surfaces is axially adjacent to and radially offset from a respective one of said first pair of recessed surfaces.
6. A fastener according to claim 5, wherein a cross-sectional area of said central body portion defined by at least said first pair of recessed surfaces is greater than a cross- sectional area of said central body portion defined by at least said second pair of recessed surfaces.

7. A fastener according to claim 1, wherein said central body portion has a substantially polygonal cross-section.

8. A fastener according to claim 1, wherein said central body portion comprises at least two diametrically opposed longitudinal recesses, each one configured to accommodate a respective one of said at least two resilient ribs.

9. A fastener according to claim 8, wherein each one of said at least two resilient ribs protrudes divergingly away from an inner surface of a respective one of said at least two diametrically opposed longitudinally recesses of said central body portion.

10. A fastener according to claim 1, wherein said head portion comprises a resilient sealing member overmoulded onto a peripheral edge of said head portion and adapted to sealingly engage with the upper surface of the second component, during use.

11. A fastener for coupling a first component to a mounting hole of a second component, the fastener comprising:
  a central body portion, insertable through the mounting hole of the second component, having a distal end and a proximal end, and a central axis between said distal end and said proximal end;
  a head portion, provided at said proximal end of said central body portion, configured to stoppingly engage with an upper surface of the second component, during use;
  at least two resilient ribs, protruding radially outward from an outer surface of said central body portion;
  at least a first pair of diametrically opposed recessed surfaces, provided at said proximal end of said central body, extending axially between said head portion and a respective shoulder portion formed by each one of said first pair of recessed surfaces towards said distal end, each one of said first pair of recessed surfaces is circumferentially spaced apart from a respective one of said at least two resilient ribs about said central axis and adapted to lockingly engage with the second component, during use,
  wherein said at least two resilient ribs extend along said outer surface of said central body portion in a direction along said central axis between said distal end and said proximal end, and axially past said respective shoulder portion;
  wherein each one of said at least two resilient ribs includes an upper edge extending outwardly from said central body portion and facing said head portion, a proximal end portion extending from the upper edge and away from said head portion, and a distal end portion extending from the proximal end portion and away from said head portion, wherein the proximal end portion tapers, inwardly toward said central body portion, when moving from the distal end portion toward the upper edge.

12. A fastener for coupling a first component to a mounting hole of a second component, the fastener comprising:
  a central body portion, insertable through the mounting hole of the second component, having a distal end and a proximal end, and a central axis between said distal end and said proximal end;
  a head portion, provided at said proximal end of said central body portion, configured to stoppingly engage with an upper surface of the second component, during use;
  at least two resilient ribs, protruding radially outward from an outer surface of said central body portion;
  a first pair of diametrically opposed recessed surfaces, provided at said proximal end of said central body, extending axially between said head portion and a respective shoulder portion formed by each one of said first pair of recessed surfaces towards said distal end, each one of said first pair of recessed surfaces is circumferentially spaced apart from a respective one of said at least two resilient ribs about said central axis and adapted to lockingly engage with the second component, during use,
  wherein said at least two resilient ribs extend along said outer surface of said central body portion in a direction along said central axis between said distal end and said proximal end, and axially past said respective shoulder portion; and
  a second pair of diametrically opposed recessed surfaces, each recessed surface of said second pair of recessed surfaces is axially adjacent to, and radially offset from, a respective one of said recessed surfaces of said first pair of recessed surfaces.

* * * * *